United States Patent [19]

Bressers et al.

[11] Patent Number: 4,829,506

[45] Date of Patent: May 9, 1989

[54] APPARATUS FOR OPTICALLY SCANNING AN INFORMATION PLANE

[75] Inventors: Andreas J. M. Bressers; Peter Coops; Adrianus J. Duijvestijn, all of Eindhoven, Netherlands

[73] Assignee: U. S. Philips Corporation, New York, N.Y.

[21] Appl. No.: 117,006

[22] Filed: Nov. 4, 1987

[30] Foreign Application Priority Data

Jul. 24, 1987 [NL] Netherlands ................... 8701749

[51] Int. Cl.⁴ .............................................. G11B 7/09
[52] U.S. Cl. .................................. 369/112; 250/201; 350/3.72
[58] Field of Search ........... 350/162.2, 162.22, 162.24, 350/3.72, 162.16; 369/110, 112, 109, 122; 250/201

[56] References Cited

U.S. PATENT DOCUMENTS

| 3,272,917 | 9/1966 | Good et al. | 350/162.24 |
| 3,861,784 | 1/1975 | Torok | 350/162.24 |
| 4,731,772 | 3/1988 | Lee | 369/45 |
| 4,733,065 | 3/1988 | Hoshi et al. | 250/201 |

OTHER PUBLICATIONS

Kimura et al., NEC Corp. Opto-Electronics Research Labs., Optical Memory Symposium, Dec. 18, 1986, "An Optical Head Using a Multi-Functioning Hologram for CD Players", (Japan), pp. 93–98.

"Optische Fokusfehlerdetektion", *Neues aus der Technik*, no. 6, vol. 15, Dec. 1980, p. 3.

*Primary Examiner*—Frank González
*Attorney, Agent, or Firm*—Algy Tamoshunas

[57] ABSTRACT

An apparatus for scanning the information plane of an optical record carrier with a radiation beam from a diode laser. The reflected radiation from the information plane is separated from the scanning beam and split into two sub-beams by a composite diffraction grating which also functions to focus the respective sub-beams on respective pairs of photodetectors. The composite grating consists of two sub-gratings which adjoin along a common bounding line, the sub-gratings having varying gratings periods and curved grating strips. Movement of the composite grating in the direction of the bounding line changes the axial imaging distance of the sub-beams from the grating, permitting adjustment of such distance to compensate for changes in the axial distance between the diode laser and the photodetector. The diode laser and photodetectors can therefore be assembled together as a single integrated unit.

4 Claims, 4 Drawing Sheets

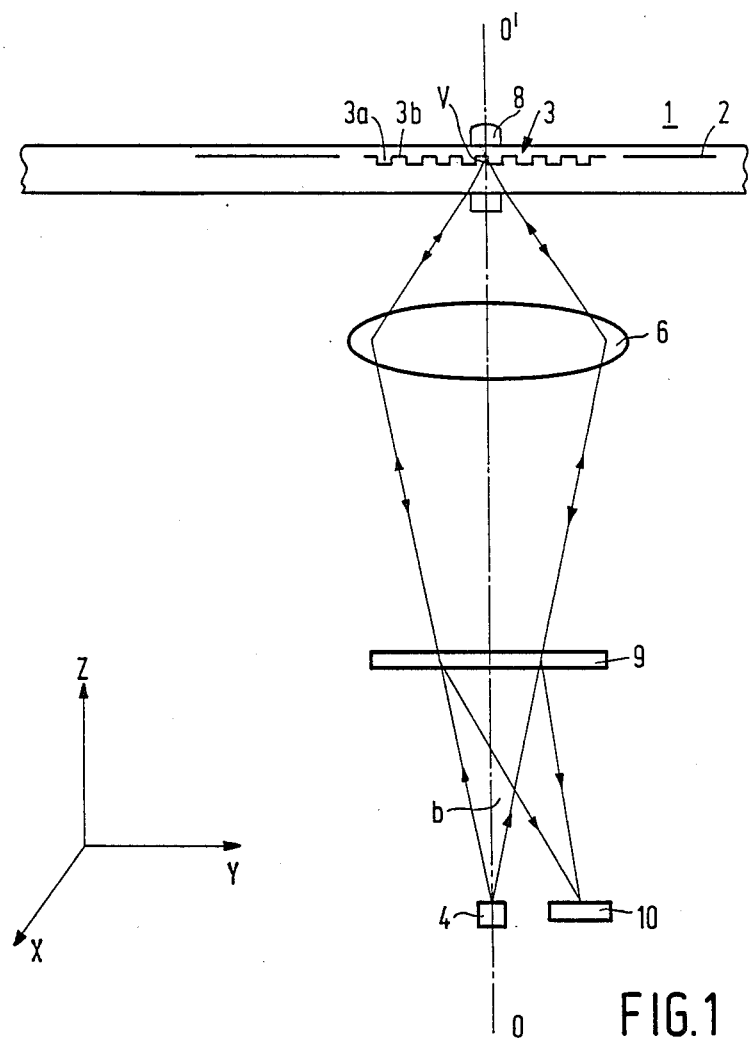
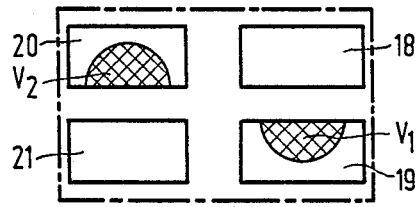 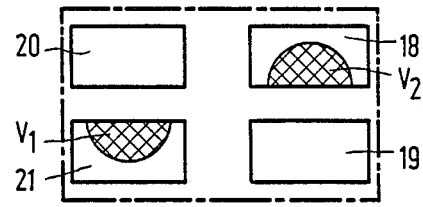
FIG. 3a  FIG. 3b

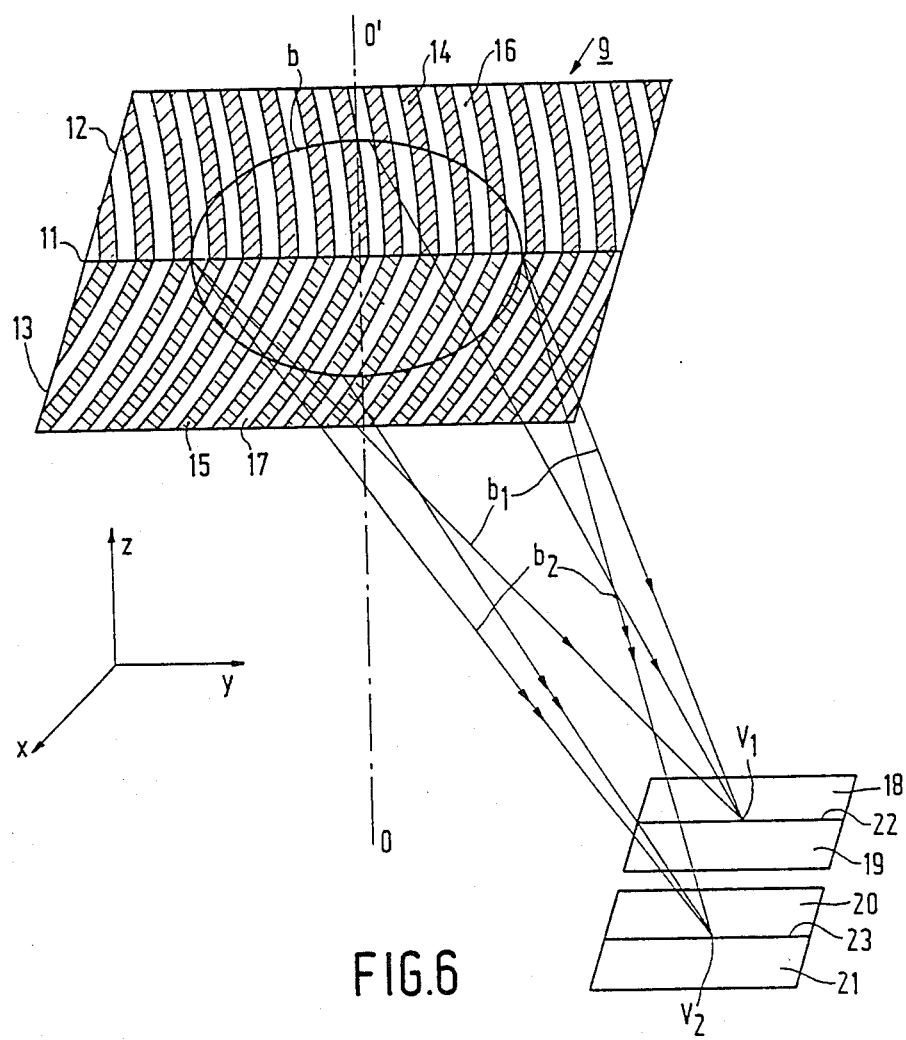

APPARATUS FOR OPTICALLY SCANNING AN INFORMATION PLANE

BACKGROUND OF THE INVENTION

1. Field of the Invention

The invention relates to a radiation-reflective apparatus for optically scanning an information plane, which apparatus comprises a diode laser supplying a scanning beam, an objective system for focussing the scanning beam to form a scanning spot on the information plane, a composite diffraction grating which is arranged between the diode laser and the objective system, which grating comprises two sub-gratings for deflecting a radiation beam reflected by the information plane to a radiation-sensitive detection system comprising two detector pairs, and for splitting said radiation beam into two sub-beams each co-operating with a separate detector pair.

2. Description of the Related Art

An apparatus of this type which is in principle suitable for reading a prerecorded record carrier and for optically recording on such a record carrier is known from U.S. Pat. No. 4,665,310 (PHN 11.531). In this apparatus the composite diffraction grating performs two functions for which otherwise two separate elements are required. Firstly, the grating ensures that the radiation which has been reflected by the information plane and which traverses the objective system is deflected from the path of the radiation emitted by the diode laser so that a detection system can be arranged in the path of the reflected radiation. Secondly, the grating splits the reflected beam into two sub-beams required for generating a focussing error signal, i.e. a signal containing information about the magnitude and the direction of a deviation between the focal plane of the objective system and the information plane. Each of the sub-beams is associated with a separate detector pair, the signal representing the difference between the output signals of the detectors of the same pair being a measure of the focussing of the canning beam on the information plane.

In the said record carrier the information is arranged in accordance with information tracks. If the bounding line between the two sub-gratings extends parallel to the track direction, it is possible, by determining the sum of the output signals of each detector pair and sub-tracting these sum signals from each other, to form a signal containing information about the magnitude and the direction of a deviation between the centre of the scanning spot and the central axis of the information track to be scanned.

In order to obtain the desired beam splitting the diffraction grating in the known apparatus comprises two sub-gratings having the same grating period, whilst the grating strips of the first sub-grating extend at a first angle and the grating strips of the second sub-grating extend at a second angle, which is equal but opposite to the first angle, to the bounding line of between the two sub-gratings. Since a diffraction grating deflects an incident beam in a plane transversely to the direction of the grating lines, the part of the beam which is incident on one of the sub-gratings will be given a different direction than the part of the beam which is incident on the second sub-grating.

There is an increasing need to reduce the dimensions of optical scanning apparatus for optical record carriers such as the known "CD players" so that these apparatus can be, for example, built in more easily. A reduction of the optical path length between the diode laser and the record carrier is of special importance. This length can be reduced if the distance between the diode laser and the diffraction grating can be reduced. When reducing this distance, the distance between the diffraction grating and the imaging lens system can also be reduced, whilst complying with the requirement that the first and higher order parts of the diffracted laser beam fall outside the pupil of this lens system. When assembling the apparatus it must be possible to accurately adjust the distance, measured in a direction parallel to the optical axis of the apparatus, between the diode laser and the detectors because otherwise an offset in the focussing error signal is produced so that the scanning beam is no longer focussed on the information plane.

In aiming at less expensive, lighter and smaller scanning apparatus it is convenient to make use of an element supplied by, for example, a semiconductor component manufacturer, which element accommodates a diode laser and detectors in the form of photodiodes, which diode laser and photodiodes are fixed with respect to each other. Due to manufacturing tolerances allowance must be made for the fact that the said distance deviates from the desired distance resulting in the offset in the focussing error signal. The influence of the said deviation will be greater as the distance between the diffraction grating and the diode laser is smaller.

The present invention provides the possibility of compensating for the focus offset in the scanning apparatus introduced as a result of an incorrect distance between the diode laser and the photodiodes in the direction of the optical axis.

As set forth in U.S. Pat. No. 4,665,310 the grating design described in this patent is based on a previously proposed composite diffraction grating. This grating comprises two sub-gratings in which the grating strips of the one sub-grating have the same direction as those of the other sub-grating, but in which the grating periods of the two sub-gratings are different. In an apparatus comprising such a composite grating the two sub-beams derived from the reflected beam are focussed in radiation spots located on a curve in a plane perpendicular to the plane of the detectors. Consequently, if the detector pairs are located in one plane, the two radiation spots cannot be focussed equally sharply with respect to their associated detector pair. An offset in the focussing error signal is therefore even sooner produced in this device than in a device with a composite diffraction grating in which the grating strips of the one sub-grating extend at an angle to those of the other sub-grating.

Consequently, and also for reasons to be stated hereinafter, the present invention is eminently suitable for use in an apparatus comprising a diffraction grating which consists of two sub-gratings whose grating lines are parallel.

SUMMARY OF THE INVENTION

The apparatus in which the present invention is used is characterized in that the diode laser and the detection system to be arranged in the apparatus are fixed with respect to each other, in that the distance measured along the optical axis of the apparatus between the diode laser and the composite grating is smaller than approximately 9 mm, in that the sub-gratings have varying grating periods and in that the grating strips of the two sub-gratings are curved.

Due to the varying grating periods and the curved grating strips the composite grating has a lens action. Consequently by displacement of this grating in the direction of the bounding line between the sub-gratings, the imaging distance of the assembly of the objective system and said grating can be adapted to the distance between the diode laser and the photodiode in the direction of the optical axis.

When using the inventive concept, it is also possible to correct for imaging errors such as coma and astigmatism which may occur when using a diffraction grating with straight grating lines. To this end the curvature of the grating lines may be adapted during manufacture of the grating.

A first embodiment of the apparatus according to the invention is further characterized in that the grating strips of the two sub-gratings at the area of the bounding lines between the two sub-gratings are perpendicular to said bounding line and in that corresponding parts of the sub-gratings have different grating periods and different curvatures of the grating strips. The sub-gratings thus have a different focal power.

A preferred embodiment of the apparatus is, however, further characterized in that corresponding parts of the sub-gratings have equal grating periods and in that the corresponding strips of the sub-gratings extend at equal but opposite angles to the bounding line between the sub-gratings.

As compared with the first embodiment, the second embodiment has the advantages mentioned in U.S. Pat. No. 4,665,310.

A diffraction grating with curved grating strips is also referred to as a hologram in the literature. It is to be noted that in a published lecture by the Firm of NEC (Japan) entitled "An optical head using a multifunctioning hologram for CD players", which lecture was held at the "Optical Memory Symposium" in Japan on Dec. 18, 1986, the use of a hologram in an optical read apparatus is described. This hologram performs three functions:

separating the diode laser beam and the beam reflected by the record carrier, splitting the latter beam into two sub-beams for focus-error detection, and providing the possibility of generating a tracking error signal.

This hologram comprises two sub-holograms deflecting the incident parts of the beam into different directions. The said publication does not state the problems for which the present invention provides a solution, which is plausible because in said publication the axial distance between the diode laser and the hologram is 18 mm. Reference is only made therein to possible influences which variation of the diode laser wavelength caused by temperature variations may have on the quality of the radiation spots formed in the detector plane. The composite hologram is stated to have a focal power of substantially zero. In addition the publication states that during assembly the position of the photodiodes is adapted to the variation of the laser beam wavelength. In the schematic representation according to FIG. 1 of the publication the slanting lines in the holograms should be assumed to be shadings defining the two sub-holograms.

According to a further characteristic feature of the apparatus of the present invention the composite diffraction grating is a phase grating having a relief structure. Such a grating has a considerably higher efficiency in the desired deflection direction than an amplitude grating and provides the additional advantage that, starting from a master grating, a large number of replicas can be manufactured in known manner at low cost, which is particularly important when using the gratings in consumer apparatus.

BRIEF DESCRIPTION OF THE DRAWINGS

The invention will now be described in greater detail by way of example with reference to the accompanying drawing in which FIG. 1 shows diagrammatically an embodiment of a read apparatus with a diffraction grating, FIGS. 3a and 3b show the variations of the radiation spots on the detectors upon the occurrence of focussing errors, FIG. 5 shows a known diffraction grating in a cross-section and FIG. 6 shows a second embodiment of the diffraction grating according to the invention and the associated radiation-sensitive detection system.

DESCRIPTION OF THE PREFERRED EMBODIMENT

Figure 2:
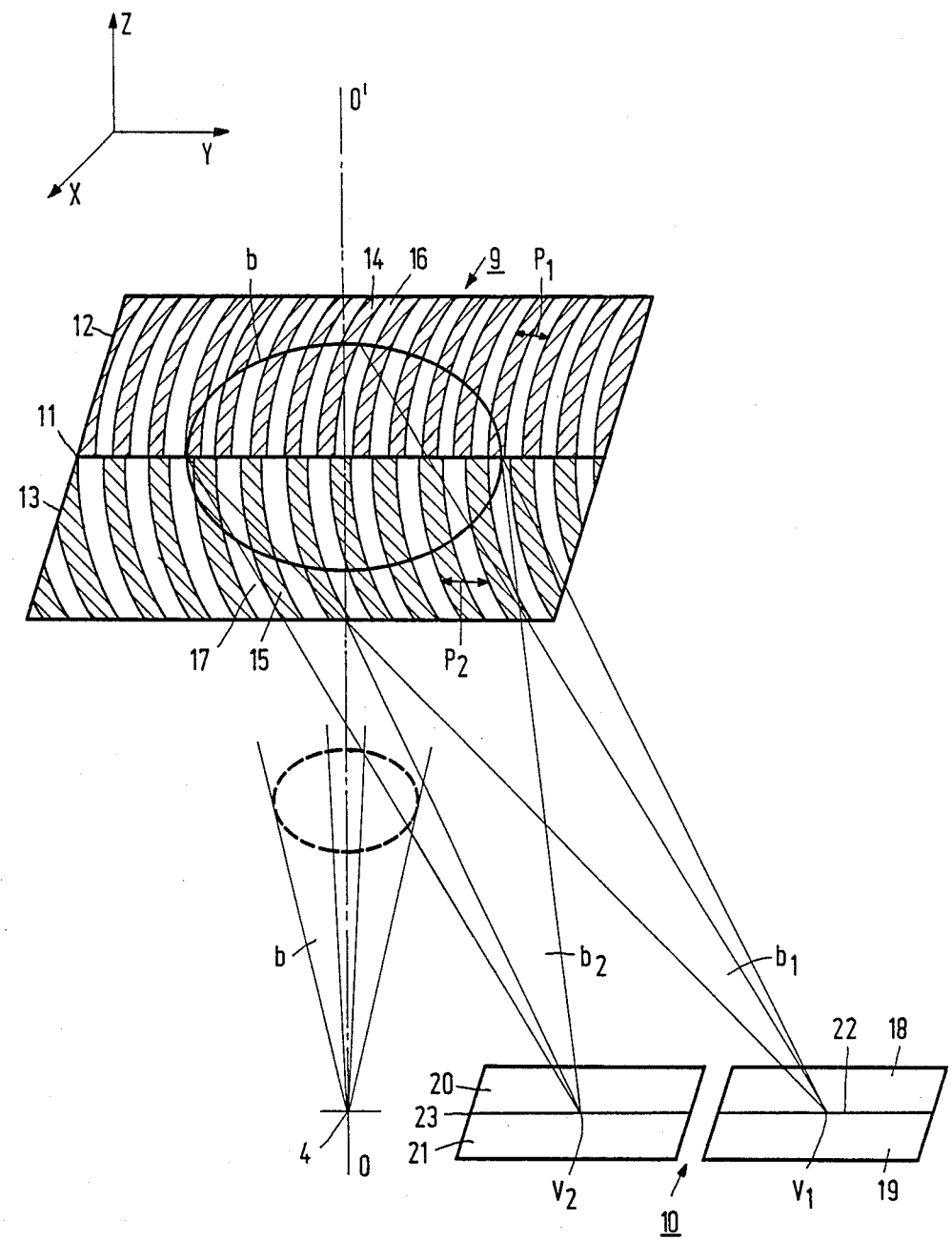
FIG. 2 is a perspective diagrammatical view of a first embodiment of the diffraction grating according to the invention and the associated radiation-sensitive detection system.

FIG. 1 is a tangential cross-sectional view of a small part of an optical disc record carrier 1 having a radiation-reflecting information plane 2. This Figure shows one of the tracks 3 situated in the information plane 2. Such a track comprises information areas 3a alternating with intermediate areas 3b, whilst, for example the areas 3a are located at a height differing from that of the intermediate areas 3b. The information surface is scanned by a beam b emitted by a radiation source 4, for example a diode laser. This beam is focussed by an objective system 6 diagrammatically represented by a single lens, to form a tiny radiation spot V in the information plane. A separate collimator lens may be arranged ahead of the objective system. The imaging system may be alternatively formed by a combined collimator-objective system as is shown in FIG. 1. As the record carrier is rotated about an axis 8, a track 3 is scanned by the read beam and the reflected beam is modulated by the information contained in this track. By moving the record carrier and the read unit, comprising the source 4, the objective system 6 and the detection system 10, in a radial direction relative to one another, the entire information surface is scanned.

The beam which has been reflected and modulated by the information surface must be detected, which means that this beam should be separated from the projected beam. Therefore the apparatus comprises a beam-separating element.

For reading an information structure with minute information details, for example of the order of 1 μm, an objective system having a large numerical aperture is required. The depth of focus of such an objective system is small. Since variations in the distance between the information plane 2 and the objective system 6 may occur which are larger than the depth of focus, steps have to be taken in order to detect these variations and, in response thereto, correct the focussing. To this end the apparatus may be provided with a beam splitter which splits the reflected beam into two sub-beams, and with, for example two detector pairs of which a first pair co-operates with the first sub-beam and the second pair co-operates with the second sub-beam. The output signals of the detectors are processed to form, inter alia, a focusservo signal.

As described in the article "Optische Fokusfehlerdetektion" in "Neues aus der Technik" no. 6, Dec. 15, 1980, page 3, beam separation and beam splitting can be effected by means of a single element, namely a transparent grating. This grating splits the beam which is reflected by the information surface 2 and which traverses the objective system 6 into a non-diffracted zero-order sub-beam and a plurality of first-order and higher-order sub-beams. The grating parameters, specifically the ratio between the width of the grating strips and that of the intermediate strips and the depth and the shape of the grating grooves may be selected in such a way that a maximum quantity of radiation is incident on the detection system.

FIG. 2 is a perspective elevational view of a first embodiment of the grating 9 and the radiation-sensitive detection system 10. The beam b is indicated by its cross-section at the area of the grating. The grating 9 comprises two sub-gratings 12 and 13 separated from each other by the line 11. The grating strips of the sub-gratings 12 and 13 are denoted by 14 and 15, respectively. These grating strips are separated by intermediate strips 16 and 17. In this embodiment the grating strips at the area of the bounding line 11 have the same direction and are for example, perpendicular to the bounding line. The average grating period $p_1$ of the sub-grating 12 is, however, different from the average grating period $p_2$ of the sub-grating 13. Consequently, the angle at which the sub-beam $b_1$ is diffracted differs from the angle at which the sub-beam $b_2$ is diffracted. This means that in the plane of the detectors the radiation spots $V_1$ and $V_2$ are offset with respect to each other in the X direction.

Radiation-sensitive detectors in the form of photodiodes 18, 19 and 20, 21 which are separated by narrow strips 22 and 23, respectively, are associated with each of the sub-beams $b_1$ and $b_2$. These detectors are positioned in such a way that in the case of a correct focussing of the beam b on the information surface 2 the radiation spots $V_1$ and $V_2$ formed by the sub-beams $b_1$ and $b_2$ are situated symmetrically relative to the detectors 18, 19 and 20, 21, respectively. When a focussing error occurs the radiation spots $V_1$ and $V_2$ become bigger and moreover these radiation spots are displaced with respect to their associated detector pair as is shown in FIGS. 3a and 3b. FIG. 3a shows the situation in which the beam b is focussed in a plane in front of the information surface 2, whereas FIG. 3b relates to the situation in which the beam b is focussed in a plane behind the information surface.

If the output signals of the detectors 18, 19, 20 and 21 are represented by $S_{18}$, $S_{19}$, $S_{20}$ and $S_{21}$, respectively, the focussing error signal will be given by:

$$S_f = (S_{18} + S_{21}) - (S_{19} + S_{20})$$

A signal which is proportional to the information being read, or the information signal $S_i$, is given by:

$$S_i = S_{18} + S_{19} + S_{20} + S_{21}$$

If the bounding line 11 of the two sub-gratings 12 and 13 extends parallel to the direction of a track 3 being read, it is also possible to generate a tracking error signal $S_r$ from the detector signals. This signal is given by:

$$S_r = (S_{18} + S_{19}) - (S_{20} + S_{21})$$

According to the invention the two sub-gratings have a varying grating period, the variation in the period being, for example, of the order of several percent of the average grating period. Moreover, as shown in FIG. 2, the grating strips of the two sub-gratings are curved. These sub-gratings thus have a variable lens action. Due to the varying grating period the positions of the radiation spots $V_1$ and $V_2$ may be varied in a direction parallel to the optical axis OO', hence in the Z direction, by displacing the grating 9 in the direction of the bounding line 11. Aberrations in a direction perpendicular to the direction of the bounding line 11 may be minimized by the curvatures of the grating strips. The possibility of displacing the Z positions of the radiation spots $V_1$ and $V_2$ is particularly important if an integrated laser-photodiode unit is used, i.e. a component in which the diode laser and the photodiodes are arranged on one support and are therefore fixed with respect to each other and thus have a fixed mutual distance in the Z direction. This distance is subject to manufacturing tolerances and cannot be corrected during assembly of the apparatus by displacing the photodiodes with respect to the laser diode in the Z direction.

Also the distance in the X direction between the diode laser and the centres of the detector pairs is subject to manufacturing tolerances. A compensation therefor can also be obtained by displacing the grating 9 in the direction of the line 11.

In the embodiment according to FIG. 2 it can be ensured that, in spite of the different angles at which the sub-beams $b_1$ and $b_2$ are deflected in the XZ plane due to the different average grating periods of the sub-gratings 12 and 13, the foci of the sub-beams are in one XY plane, namely by giving the grating periods and the curvatures of the grating strips of corresponding parts of the sub-gratings a different variation.

An important advantage of the diffraction grating having curved grating strips as compared with a grating having straight grating strips is that the optical aberrations such as coma and astigmatism which may occur when using the last-mentioned grating can be avoided in the first-mentioned grating by taking these aberrations into account in the manufacture of this grating and adapting the curvature of the grating strips thereto.

Figure 4:
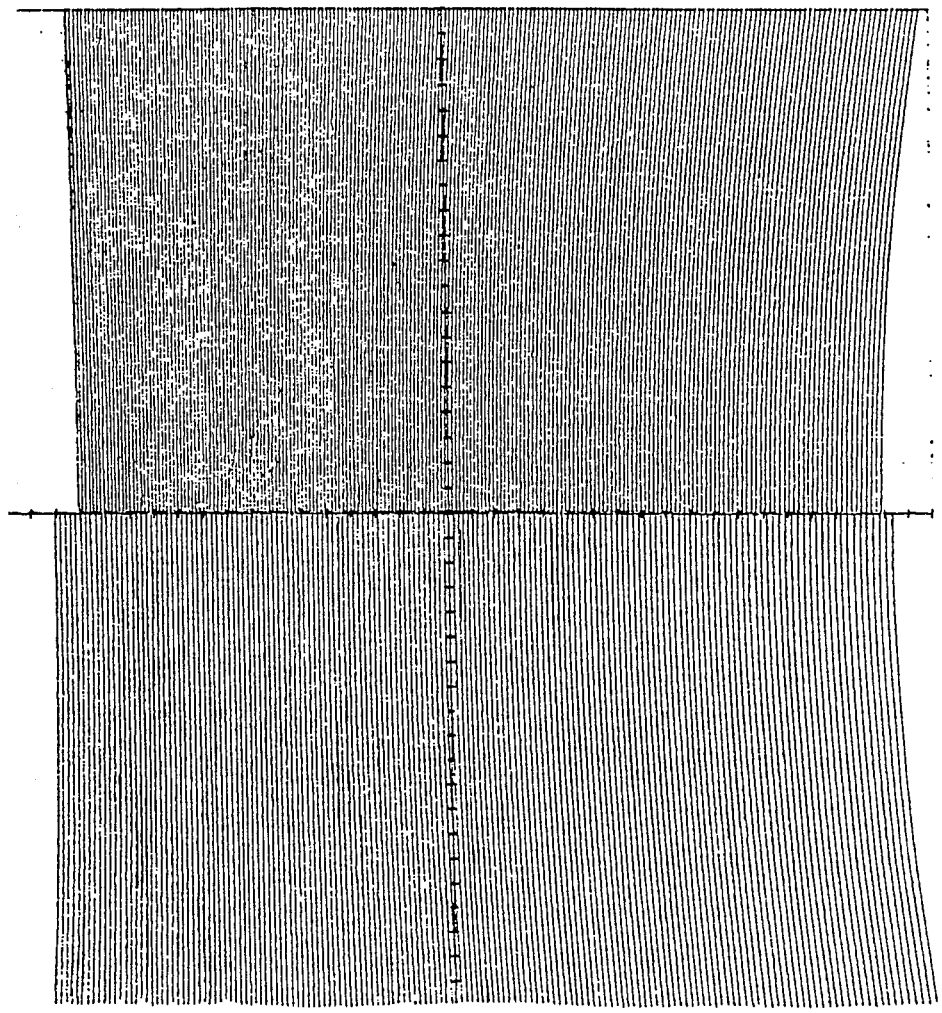
FIG. 4 shows an actual grating of the type according to FIG. 2.

FIG. 4 shows a part of an actual composite diffraction grating as can be used in the apparatus according to FIG. 1. In one of the sub-gratings the grating period varies between, for example 1.6 μm and 1.8 μm, whereas in the other sub-grating this period varies between, for example 2.4 and 2.7 μm. The diameter is, for example 800 μm for such a grating with a round circumference.

The diffraction grating is preferably a phase grating in the form of a relief structure in which the grating grooves are located at a height which is different from that of the intermediate strips. The principle of such a grating is indicated in FIG. 5a. Such a grating can be optimised by suitable choice of the ratio between the width $W_1$ of the grating grooves 14 and the width $W_2$ of the intermediate strips 16 and of the depth of the grooves. In addition the shape of the groves can be adapted. Instead of the rectangular symmetrical shape shown in FIG. 5a, an asymmetrical shape is preferred, for example a sawtooth shape (FIG. 5b) because then a maximum quantity of radiation can be concentrated in one order, for example the +1 order.

An amplitude grating or black-white grating may be used alternatively instead of a phase grating. This grating can be optimised by adapting the variation of the blackening.

Both the amplitude grating and the phase grating may be copied in large numbers from a so-called master grating, the phase grating providing the advantage that it can be copied at low cost in large numbers because known pressing or replica techniques can be used which are very suitable for bulk manufacture.

The master grating can be obtained holographically. Thereby an arrangement is used in which radiation sources emitting diverging beams are arranged in the position of the source 4 and the desired positions of the radiation spot $V_1$ and the radiation spot $V_2$ in FIG. 2. A photographic plate is then provided in the position of the grating 9 in FIG. 2. Firstly, one-half of the plate is exposed with the beams emitted by the radiation sources in the positions of the source 4 and the spot $V_1$, whilst the other half of the plate is shielded. Subsequently the exposed half of the plate is shielded and the other half is exposed with the beams emitted by the radiation sources in the positions of the source 4 and the radiation spot $V_2$. The different interference patterns thus obtained on both halves of the plate can be converted into relief structures by means of known developing and etching techniques.

Given the positions of the radiation source 4, the diffraction grating 9 and the photodiodes, it is alternatively possible to calculate the patterns of the sub-gratings and subsequently write these patterns in an electron-sensitive material by means of, for example, an electron beam write apparatus.

FIG. 6 shows a second embodiment of the apparatus This apparatus comprises a diffraction grating whose sub-gratings have the same grating period. The main directions of the curved grating strips 14 of the sub-grating 12 extend at a first angle to the bounding line 11, whilst the main directions of the curved grating strips 15 of the second sub-grating 13 extend at a second, preferably equally large but opposite angle to the bounding line. The sub-beams are mainly deflected in a direction transversely to the main directions so that the photodiodes must be arranged differently than in FIG. 2. The bounding lines 22 and 23 of the detector pairs in the XY plane are now located one after the other in the Y direction. The focussing error signal, the information signal and the tracking error signal are obtained in the same way as described with reference to FIG. 2.

Since the efficiency of a diffraction grating, i.e. the quotient of the quantity of radiation diffraction in the desired direction and the total quantity of radiation incident on the grating depends on, inter alia, the grating period, the composite diffraction grating shown in FIG. 6 is preferred to that shown in FIG. 2. In fact, due to the unequal grating periods of the sub-gratings in FIG. 2 the sub-beams may obtain unequal intensities so that an offset in the tracking error signal may be produced. This cannot occur in an apparatus comprising the diffraction grating as shown in FIG. 6.

The invention has been described for use in a read apparatus, but it may alternatively be used in a write apparatus or in a combined write-read apparatus in which during recording the focussing and the tracking of the write beam are monitored. The focus error detection system described does not utilize special properties of the information surface 2. It is merely necessary and adequate that this surface is reflecting. Therefore, the invention may be used in various apparatus where very accurate focussing is required, for example in microscopes, in which case the tracking-error detection may be dispensed with.

What is claimed is:

1. An apparatus for optically scanning an information plane, which apparatus comprises a diode laser supplying a scanning beam, an objective system for focussing the scanning beam along an optical axis of the apparatus so as to form a scanning spot on the information plane, a composite diffraction grating which is arranged between the diode laser and the objective system, which composite grating comprises two sub-gratings for deflecting a radiation beam reflected by the information plane to a radiation-sensitive detection system comprising two detector pairs, and for splitting said radiation beam into two sub-beams each imaged on a separate detector pair, each sub-grating having a plurality of parallel strips, the two sub-gratings adjoining along a common bounding line; characterized in that: the diode laser and the detection system are assembled together as a single integrated unit wherein the axial distance as measured along the optical axis of the apparatus between the diode laser and the detection system has a nominally fixed value; the axial distance between the diode laser and the composite grating is smaller than approximately 9 mm; and the sub-gratings have varying grating periods and the sub-grating strips thereof are curved; whereby the composite grating acts as a lens which when displaced in a direction parallel to said bounding line changes the axial imaging distance of said sub-beams and so can adjust the imaging of said sub-beams on said detector pairs to correspond with variations in said nominally fixed value of the axial distance between said diode laser and said detector pairs.

2. An apparatus as claimed in claim 1, characterized in that the sub-grating strips of the two sub-gratings at the area of the bounding line, between the two sub-gratings are perpendicular to said bounding line and corresponding parts of the two sub-gratings have different grating periods and different curvatures of the sub-grating strips.

3. An apparatus as claimed in claim 1, characterized in that corresponding parts of the two sub-gratings have equal grating periods, and corresponding strips of the sub-gratings extend at equal but opposite angles to the bounding line between the sub-gratings.

4. An apparatus as claimed in claim 1, 2 or 3, characterized in that the composite diffraction grating is a phase grating having a relief structure.

* * * * *